United States Patent

Rumpsa et al.

Patent Number: 5,566,546
Date of Patent: Oct. 22, 1996

[54] METHOD OF INFERRING SOAK TIMES FOR AN ELECTRONIC ENGINE CONTROL SYSTEM

[75] Inventors: Todd A. Rumpsa, Royal Oak; Michael J. Cullen, Northville, both of Mich.

[73] Assignee: Ford Motor Company, Dearborn, Mich.

[21] Appl. No.: 364,380

[22] Filed: Dec. 27, 1994

[51] Int. Cl.$^6$ ........................................................ F01N 3/20
[52] U.S. Cl. ................................. 60/274; 60/277; 60/284; 60/285
[58] Field of Search ............................. 60/274, 277, 284, 60/285

[56] References Cited

U.S. PATENT DOCUMENTS 4,747,386  5/1988  Onishi ..................... 123/491

Primary Examiner—Douglas Hart
Attorney, Agent, or Firm—Roger L. May; Peter Abolins

[57] ABSTRACT

The present invention is a method for obtaining an inferred soak time suitable for inferring exhaust system and other temperatures with sufficient accuracy to permit control of at least one feature of an internal combustion engine to be based thereon. In this way, soak time strategy can be inexpensively incorporated into an engine control system not based on soak time or soak timer hardware can be replaced in control systems with soak time strategy. The temperature of the engine and of the charging air supplied to the engine are measured at the time the engine is turned off and when the engine is restarted. The measured temperature of the engine and of the charging air at the time the engine is turned off is stored in a computer memory. The inferred soak time is obtained using the measured temperature of the engine and of the charging air stored at the time the engine is turned off and measured at the time the engine is restarted. In one embodiment, the present inferred soak time calculated based on the equation:

$$\text{soak-time} = \left[ -\ln\left( \frac{(ET - AT)}{(ET_s - AT_s)} \right) \right] * TC$$

Where $ET_s$ and $AT_s$ are respectively the stored engine and charging air temperatures, $ET$ and $AT$ are respectively the engine and charging air temperatures at the time the engine is restarted, and $TC$ is a first order time constant calibrated using actual soak times measured for a plurality of engine and charging air temperatures.

20 Claims, 1 Drawing Sheet

METHOD OF INFERRING SOAK TIMES FOR AN ELECTRONIC ENGINE CONTROL SYSTEM

FIELD OF THE INVENTION

The present invention is related to a method for inferring soak times for use in an electronic engine control system, and more particularly to such a method used in controlling the air/fuel ratio and/or the exhaust system temperatures of an internal combustion engine.

BACKGROUND OF THE INVENTION

With so much emphasis being placed on fuel economy, engine performance and exhaust emissions, a majority of today's vehicles powered by an internal combustion engine include electronic engine control systems with strategies for controlling various features of the engine's operation including the air/fuel ratio (i.e., ratio of the mixture of charging air and fuel supplied to the engine) and/or various engine exhaust system temperatures.

The air/fuel ratio is controlled to optimize fuel economy and engine performance. It may also be used to control various temperatures associated with the exhaust system, in particular the temperature of the engine exhaust gases. Certain temperatures associated with the exhaust system are controlled apart from the air/fuel ratio.

Thus, most internal combustion engine vehicles include an exhaust system with an exhaust manifold connecting the engine with the remainder of the exhaust system, and a catalytic converter and one or more exhaust gas oxygen (EGO) sensors up stream from the catalyst for emissions control purposes. It is important to know and control the temperature at various locations along an engine's exhaust system. For example, the temperature inside the catalytic converter must be controlled to protect against the catalyst being damaged from overheating. It is also important to know the temperature of each EGO sensor because these sensors should typically be warmed up before being operated. Electronic engine control systems which employ EGO sensors often control one or more heaters for warming up the EGO sensors. Thus, the temperature of each EGO sensor should be identified in order to most efficiently and effectively utilize the heaters. Such control systems also often include a closed loop fuel control strategy to optimize exhaust emissions. However, until the EGO sensors are operational, the engine control system is unable to properly utilize its closed loop fuel control strategy.

Therefore, in properly controlling an engine's operation, it is often necessary for the temperature at such locations in the engine's exhaust system, as well as the temperature at other locations considered important in controlling the engine's operation, to be identified at the time the engine is started. By knowing the initial temperature at such locations, the air/fuel ratio, the exhaust system and other features of the engine's operation can be more accurately controlled at the initial stages after the engine is turned on. Rather than incurring the expense associated with being directly measured, some engine control strategies have these initial exhaust system temperatures, and other temperatures, preset in their software. However, these preset temperatures often do not correspond to the actual temperatures with sufficient accuracy. By using an actual soak time for the engine, previously preset temperatures could be more accurately inferred. Soak time is the time between when the engine is turned off and then restarted. Previous electronic engine control systems have included a timer for measuring the actual soak time of the engine. The soak time is then used with existing engine control strategies to infer initial exhaust system, as well as other, temperatures following a soak.

However, not all vehicles are designed with a soak timer in its engine control system, and incorporating a soak timer into such a system is costly. Therefore, there is a need for an inexpensive way to incorporate soak time strategy in an engine control system not originally designed to use actual soak time strategy. In addition, because there is a continuing need to lower costs, there is also a need for a way to eliminate the expense of using an actual timer to obtain soak times for those engine control systems which are already designed to use soak time strategy and hardware.

SUMMARY OF THE INVENTION

The present invention satisfies these needs by providing an inexpensive method for obtaining an inferred soak time suitable for inferring exhaust system and other temperatures with sufficient accuracy to permit control of at least one feature of an internal combustion engine to be based thereon, such as the air/fuel ratio and/or engine exhaust temperatures. In this way, soak time strategy can be inexpensively incorporated into an engine control system not designed to use actual soak time strategy or the soak timer and associated hardware can be replaced in those engine control systems originally designed to use a soak time strategy. If it is undesirable for the soak timer to be replaced, it may still be desirable to use an inferred soak time in the control strategy as a diagnostic check of the actual soak timer.

An inferred soak time is obtained according to the principles of the present invention by measuring the temperature of the engine and of the charging air supplied to the engine at the time the engine is turned off and when the engine is restarted. These temperatures are often already being monitored by the engine control system. The measured temperature of the engine and of the charging air at the time the engine is turned off is stored in a computer memory, preferably incorporated into the electronic engine control system. The inferred soak time is obtained using the measured temperature of the engine and of the charging air stored at the time the engine is turned off and measured at the time the engine is restarted. The temperature of the engine may be based on the temperature of a combustion chamber wall or any other suitable portion of the engine. Satisfactory results have been obtained by basing the temperature of the engine on the actual temperature of the engine coolant.

In one embodiment, the present inferred soak time is calculated based on the equation:

$$\text{soak-time} = \left[ -\ln\left( \frac{(ET - AT)}{(ET_s - AT_s)} \right) \right] * TC$$

Where $ET_s$ is the temperature of the engine stored at the time that the engine is turned off, $AT_s$ is the temperature of the charging air stored at the time that the engine is turned off, $ET$ is the temperature of the engine at the time the engine is restarted, $AT$ is the temperature of the charging air at the time the engine is restarted and $TC$ is a first order time constant calibrated for the engine using actual soak times measured for a plurality of engine and charging air temperatures. Instead of using computer software that actually performs the above calculation, the software can be based on a look-up table indexed with an input equalling:

$$\frac{(ET - AT)}{(ET_s - AT_s)}$$

and an output equalling the inferred soak time.

In one aspect of the present invention, an engine control system is provided for controlling at least one feature of an internal combustion engine supplied with an engine coolant and a mixture of charging air and fuel. The applicable features that may be controlled are not intended to be limited to those associated with the engine itself but may also include features of any part of the powertrain as well as features of the emissions control system. Possible examples of features that may be controlled according to the principles of the present invention include: the air/fuel ratio, exhaust gas oxygen sensors, spark angle, electrically heated catalyst (EHC) temperature, thermactor air temperature, etc.

The engine control system comprises an engine sensor for measuring the temperature of the engine, and an air sensor for measuring the temperature of the charging air. The engine control system includes at least one computer with software for storing the temperature measured by the engine and air sensors at the time the engine is turned off, software for calculating the inferred soak time based on the temperature of the engine and the charging air stored at the time the engine is turned off and measured at the time the engine is restarted, and a software control strategy based on the inferred soak time. This software control strategy may be based on an engine exhaust temperature (e.g., a catalyst midbed temperature, an exhaust gas oxygen sensor temperature, and an exhaust manifold gas temperature) inferred from the inferred soak time.

The engine control system may also include at least one mechanism capable of being actuated for regulating the air/fuel ratio used in the engine. The control system's at least one computer would then include software for controlling actuation of the at least one mechanism hand thereby control the air/fuel ratio used in the engine based on the inferred soak time calculated according the present invention. The air/fuel ratio used in the engine may be controlled based on not only the inferred soak time but also temperatures inferred from the inferred soak time, including one or more exhaust system temperatures (e.g., a catalyst midbed temperature, an exhaust gas oxygen sensor temperature, and an exhaust manifold gas temperature) and the temperature of the mechanism supplying fuel to the engine (e.g., a carburetor or fuel injectors).

In another aspect of the present invention, a control method of controlling at least one feature of an internal combustion engine is provided which comprises the steps of: measuring the temperature of the engine at the time the engine is turned off and when the engine is restarted; measuring the temperature of the charging air at the time the engine is turned off and when the engine is restarted; storing the measured temperature of the engine and of the charging air at the time the engine is turned off in a computer memory; providing an inferred soak time using a computer program based on the temperature of the engine and of the charging air stored at the time the engine is turned off and measured at the time the engine is restarted; and controlling at least one feature of the engine using a software strategy based on the inferred soak time. The at least one feature of the engine may include any applicable feature of the powertrain or the emissions control system, not just a feature of the engine itself. When the air/fuel ratio is being controlled, the control method further comprises the steps of: actuating at least one mechanism for regulating the air/fuel ratio used in the engine; and controlling the air/fuel ratio used in the engine by controlling the actuation of the at least one mechanism using a computer program based on the calculated inferred soak time.

Because soak time is inferred, the present invention eliminates the expense of soak timer hardware in control systems designed to include a soak timer. The present invention can be readily used with the existing software strategy of previous soak timer based control systems. The present invention also avoids the expense of incorporating soak timer hardware in control systems originally designed without a soak timer. For non-soak timer designed control systems, the present invention enables soak time strategies to be used by making relatively inexpensive software changes rather than more expensive hardware changes.

DETAILED DESCRIPTION OF THE INVENTION

Figure 1:
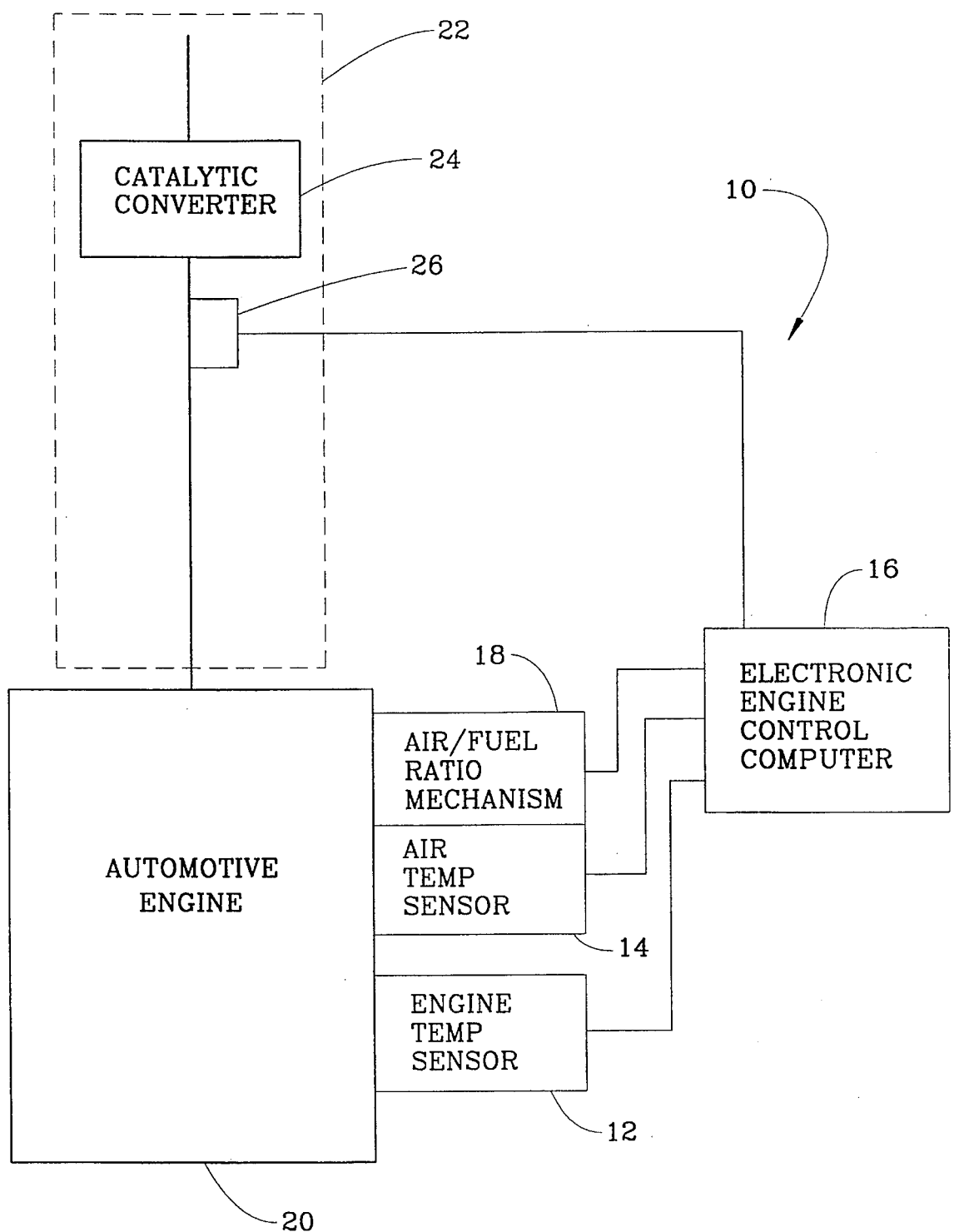
FIG. 1 is a block diagram of one embodiment of an electronic engine control system for an automotive engine according to the principles of the present invention.

Although the present invention is herein described in terms of specific embodiments for use with automotive vehicles having an electronic engine control system using a soak timer, it will be readily apparent to those skilled in this art that various modifications, re-arrangements, and substitutions can be made without departing from the spirit of the invention, including modifying the software of a control system designed without a soak timer to use an inferred soak time obtained according to the present invention. In addition, it is apparent that while an inferred soak time is hereafter described as being used in a control system to control specific engine features, a greater number and variety of features may also be controlled by use of an inferred soak time. The scope of the present invention is thus only limited by the claims appended hereto.

Referring to FIG. 1, one embodiment of an electronic engine control system 10 according to the present invention includes an engine temperature sensor 12 and an air temperature sensor 14 interconnected with at least one control computer 16. Control computer 16 is operatively adapted to control the actuation of at least one mechanism 18 for regulating and supplying the mixture of air and fuel (i.e., air/fuel ratio) to an automotive engine 20 having an exhaust system 22. The mechanism 18 may include one or more of a number of devices well known in the art, such as a fuel injector. The mechanism 18 does not form a basis for the present invention, and will therefore not be described in further detail herein.

Control system 10 is of the type having one or more control computers 16 with a software strategy which uses a soak time to infer one or more temperatures, for example, in the exhaust system 22 of engine 20. One such software strategy is disclosed in U.S. patent application Ser. No. 08/196,735 and entitled METHOD AND APPARATUS TO LIMIT A MIDBED TEMPERATURE OF A CATALYTIC CONVERTER, which is incorporated herein by reference in its entirety. Soak time is herein defined as being the time between when the engine 20 is turned off and then restarted. The performance of a fuel injector typically changes as its temperature changes. Therefore, it may also be desirable for control system 10 to use the soak time to compensate for temperature changes in the fuel injectors.

In the past, timers (not shown) were incorporated into such control systems to provide an actual soak time. With the present control system 10, the computer 16 is provided with software for calculating an inferred soak time based on parameters which are already being monitored, namely the temperature of the engine 20 and the charging air supplied to the engine 20. The software of computer 16 monitors the engine temperature via sensor 12 and the charging air temperature via sensor 14. Engine 20, like most automotive engines, is supplied with an engine coolant by any one of a number of well known ways which do not form a basis for the present invention and are therefore not described in further detail herein. The temperature of engine 20 is preferably measured by monitoring the coolant temperature with sensor 12.

The computer 16 stores in keep-alive memory the temperature measured by the engine sensor 12 and the charging air sensor 14 at the time the engine 20 is turned off. The software of computer 16 provides an inferred soak time based on the temperature of the engine coolant and charging air stored at the time the engine is turned off and measured by the sensors 12 and 14 at the time the engine 20 is restarted. Actuation of the mechanism 18 by computer 16 and thereby control of the air/fuel ratio used in engine 20, as well as other engine features, is based on this inferred soak time. Using an inferred soak time eliminates the need for a timer and any associated hardware, reducing the overall cost of the control system 10. In addition, the control strategy of systems which were not originally designed to use a soak time can now be readily adapted to use the present inferred soak time.

Various elements of an automotive exhaust system 22 usually have prescribed upper temperature limits. To avoid damage to the exhaust system 22, these upper limits should not be exceeded. Typical exhaust systems 22 include a catalytic converter 24 with a catalyst (not shown) for emissions control purposes. The hottest spot in a catalytic converter is usually, what is referred to as, the catalyst midbed temperature. If this temperature exceeds a prescribed upper limit, the emissions control characteristic of the catalyst can be impaired or destroyed. In fact, if the air/fuel ratio is not properly controlled the catalyst midbed temperature could increase to the point of possibly even melting portions of the catalytic converter 24.

Some automotive exhaust systems 22 also include one or more exhaust gas oxygen (EGO) sensors 26 for monitoring the exhaust gas oxygen content upstream of the catalytic converter 24 for emissions control purposes. Each EGO sensor 26 typically should be warmed up before being operated. One or more heaters (not shown) are preferably used to perform this warm up operation. Thus, the temperature of each EGO sensor should be identified not only to identify whether it has warmed up sufficiently but also to efficiently and effectively utilize the heaters. Engine control systems using EGO sensors include a closed loop fuel control feature to optimize exhaust emissions. Until the EGO sensors 26 become operational, however, the engine control system 10 cannot properly utilize its closed loop fuel control strategy.

The computer 16 of the present control system 10 is capable of inferring the temperature of the EGO sensors 26 and the catalyst midbed temperature at the time engine 20 is restarted based on the inferred soak time calculated according to the present invention. The air/fuel ratio and time needed to suitably warm up the EGO sensors 26 and to reach the upper limit of the catalyst midbed temperature can then be calculated based on these inferred exhaust system temperatures.

Acceptable results have been obtained by calculating inferred soak times based on the equation:

$$\text{soak-time} = \left[ -\ln\left( \frac{(ET - AT)}{(ET_s - AT_s)} \right) \right] * TC$$

Where $ET_s$ is the temperature of the engine 20 at the time the engine is turned off, $AT_s$ is the temperature of the charging air at the time the engine is turned off, ET is the temperature of the engine at the time the engine is restarted, AT is the temperature of the charging air at the time the engine is restarted, and TC is a first order Time Constant calibrated for the engine 20 using actual soak times measured for a plurality of engine and charging air temperatures. Satisfactory results have been obtained by using the engine coolant temperature for the engine temperatures.

The time constant TC has been found to be dependent, to a varying degree, on the design of the engine 20 and exhaust system 22 as well as on the vehicle (not shown) they are used in. Thus, for automotive applications, the time constant TC will likely need to be calibrated for each vehicle model and year. In addition, instead of using computer software that actually performs the above calculation, the software can be based on a look-up table indexed with an input equalling:

$$\frac{(ET - AT)}{(ET_s - AT_s)}$$

and an output equalling the inferred soak time. That is, the above soak time equation could be implemented in the engine control strategy with a fox (function of X) function for the LOG over the relevant range.

Tables I–III below provide the results of three tests performed to obtain the data needed to deduce a time constant TC, to compare inferred soak times $ST_{inf}$ calculated using the above equation with actual soak times $ST_{Act}$ measured using a timer and to compare inferred and actual front midbed temperatures ($MT_{inf}$ and $MT_{Act}$) in the catalytic converter 24. Satisfactory time constants TC were obtained by first taking a plurality of engine coolant temperatures ET and charging air temperatures AT measured at a plurality of actual soak times $ST_{Act}$, plugging this data into the above-described equation and solving the equation for the time constant TC. The resulting time constants TC's were then analyzed and compared to obtain a single time constant TC which most consistently generated inferred soak times $ST_{Inf}$ closely matching actual soak times $ST_{Act}$. A time constant TC of 2450 was obtained as a result of just such an analysis. The inferred soak times $ST_{inf}$ found in Tables I–III were calculated using measured charging air temperatures AT and engine coolant temperatures ET with the time constant TC of 2450.

The actual front midbed temperatures $MT_{Act}$ were measured and the inferred front midbed temperatures $MT_{Inf}$ were inferred from the inferred soak times $ST_{Inf}$. Any suitable technique used to infer front midbed temperatures from actual soak times may be used to infer front midbed temperatures from inferred soak times. Such a technique is disclosed in U.S. patent application Ser. No. 08/196,735, entitled METHOD AND APPARATUS TO LIMIT A MIDBED TEMPERATURE OF A CATALYTIC CONVERTER. The actual technique used to obtain the inferred front midbed temperatures found in Tables I–III forms no basis for the present invention and is therefore not disclosed in further detail herein.

The initial conditions for each test varied. For the test results of Table I, the ET was 202° F., the AT was 74° F. and the inferred ambient air temperature outside of the test vehicle was 58° F. For the test results of Table II, ET was 200° F., AT was 40° F. and the inferred ambient air temperature was −4° F. For the test results of Table III, ET was 158° F., the AT was 80° F. and the inferred ambient air temperature was −4° F.

TABLE I

| | | | | |
|---|---|---|---|---|
| $ST_{Act}$ (sec) | 0.0 | 120.0 | 240.0 | 360.0 | 480.0 |
| $ST_{Inf}$ (sec) | 0.0 | 119.1 | 244.1 | 421.3 | 514.9 |
| $MT_{Act}$ (°F.) | 990.0 | 913.1 | 843.1 | 780.9 | 725.7 |
| $MT_{Inf}$ (°F.) | 990.0 | 923.2 | 858.1 | 774.2 | 733.5 |
| AT (°F.) | 74.0 | 80.0 | 84.0 | 90.0 | 94.0 |
| ET (°F.) | 202.0 | 202.0 | 200.0 | 198.0 | 198.0 |
| $ST_{Act}$ (sec) | 600.0 | 720.0 | 840.0 | 960.0 | 1080.0 |
| $ST_{Inf}$ (sec) | 612.2 | 765.7 | 873.5 | 1044.6 | 1044.6 |
| $MT_{Act}$ (°F.) | 676.3 | 634.0 | 595.7 | 557.2 | 525.9 |
| $MT_{Inf}$ (°F.) | 693.7 | 635.5 | 597.9 | 543.1 | 543.1 |
| AT (°F.) | 96.0 | 100.0 | 102.0 | 106.0 | 106.0 |
| ET (°F.) | 196.0 | 194.0 | 192.0 | 190.0 | 190.0 |
| $ST_{Act}$ (sec) | 1200.0 | 1320.0 | 1440.0 | 1560.0 | 1680.0 |
| $ST_{Inf}$ (sec) | 1165.6 | 1292.8 | 1426.9 | 1496.8 | 1642.7 |
| $MT_{Act}$ (°F.) | 496.6 | 468.3 | 443.0 | 417.7 | 395.5 |
| $MT_{Inf}$ (°F.) | 507.8 | 473.4 | 440.0 | 423.7 | 391.8 |
| AT (°F.) | 108.0 | 110.0 | 112.0 | 112.0 | 114.0 |
| ET (°F.) | 188.0 | 186.0 | 184.0 | 182.0 | 180.0 |
| $ST_{Act}$ (sec) | 1800.0 | 1920.0 | 2040.0 | 2160.0 | 2280.0 |
| $ST_{Inf}$ (sec) | 1719.0 | 1797.7 | 1879.1 | 1963.1 | 2050.2 |
| $MT_{Act}$ (°F.) | 375.4 | 356.4 | 338.3 | 321.4 | 306.5 |
| $MT_{Inf}$ (°F.) | 376.3 | 361.0 | 346.0 | 331.2 | 316.8 |
| AT (°F.) | 114.0 | 114.0 | 116.0 | 116.0 | 116.0 |
| ET (°F.) | 178.0 | 176.0 | 176.0 | 174.0 | 172.0 |
| $ST_{Act}$ (sec) | 2400.0 | 2520.0 | 2640.0 | 2760.0 | 2880.0 |
| $ST_{Inf}$ (sec) | 2140.4 | 2234.0 | 2432.5 | 2538.0 | 2538.0 |
| $MT_{Act}$ (°F.) | 290.5 | 276.7 | 262.8 | 250.0 | 237.3 |
| $MT_{Inf}$ (°F.) | 302.6 | 288.7 | 261.8 | 248.8 | 248.8 |
| AT (°F.) | 116.0 | 116.0 | 118.0 | 118.0 | 118.0 |
| ET (°F.) | 170.0 | 168.0 | 166.0 | 164.0 | 164.0 |
| $ST_{Act}$ (sec) | 3000.0 | 3120.0 | 3240.0 | 3360.0 | 3480.0 |
| $ST_{Inf}$ (sec) | 2648.2 | 2648.2 | 2763.6 | 2884.6 | 2763.6 |
| $MT_{Act}$ (°F.) | 224.5 | 213.8 | 203.1 | 193.5 | 185.0 |
| $MT_{Inf}$ (°F.) | 236.1 | 236.1 | 223.7 | 211.6 | 223.7 |
| AT (°F.) | 118.0 | 118.0 | 118.0 | 118.0 | 116.0 |
| ET (°F.) | 162.0 | 162.0 | 160.0 | 158.0 | 158.0 |
| $ST_{Act}$ (sec) | 3600.0 | 3720.0 | 3840.0 | 3960.0 | 4080.0 |
| $ST_{Inf}$ (sec) | 2884.6 | 3011.8 | 3011.8 | 3145.9 | 3145.9 |
| $MT_{Act}$ (°F.) | 175.4 | 167.9 | 159.4 | 153.0 | 145.5 |
| $MT_{Inf}$ (°F.) | 211.6 | 199.9 | 199.9 | 188.5 | 188.5 |
| AT (°F.) | 116.0 | 116.0 | 116.0 | 116.0 | 116.0 |
| ET (°F.) | 156.0 | 154.0 | 154.0 | 152.0 | 152.0 |
| $ST_{Act}$ (sec) | 4200.0 | 4320.0 | 4440.0 | 4560.0 | 4680.0 |
| $ST_{Inf}$ (sec) | 3145.9 | 3287.7 | 3287.7 | 3438.0 | 3438.0 |
| $MT_{Act}$ (°F.) | 139.1 | 133.8 | 128.5 | 123.1 | 117.8 |
| $MT_{Inf}$ (°F.) | 188.5 | 177.4 | 177.4 | 166.7 | 166.7 |
| AT (°F.) | 114.0 | 114.0 | 114.0 | 114.0 | 114.0 |
| ET (°F.) | 150.0 | 148.0 | 148.0 | 146.0 | 146.0 |
| $ST_{Act}$ (sec) | 4800.0 | 4920.0 | 5040.0 | 5160.0 | |
| $ST_{Inf}$ (sec) | 3438.0 | 3598.1 | 3598.1 | 3769.2 | |
| $MT_{Act}$ (°F.) | 113.6 | 110.4 | 106.1 | 102.9 | |
| $MT_{Inf}$ (°F.) | 166.7 | 156.4 | 156.4 | 146.4 | |
| AT (°F.) | 112.0 | 112.0 | 112.0 | 112.0 | |
| ET (°F.) | 144.0 | 142.0 | 142.0 | 140.0 | |

TABLE II

| | | | | | |
|---|---|---|---|---|---|
| $ST_{Act}$ (sec) | 0.0 | 120.0 | 180.0 | 240.0 | 360.0 |
| $ST_{Inf}$ (sec) | 0.0 | 62.8 | 127.2 | 227.1 | 366.8 |
| $MT_{Act}$ (°F.) | 1114.4 | 1006.2 | 968.8 | 931.3 | 862.4 |
| $MT_{Inf}$ (°F.) | 1114.0 | 1071.0 | 1028.6 | 966.1 | 884.9 |
| AT (°F.) | 40.0 | 46.0 | 50.0 | 54.0 | 60.0 |
| ET (°F.) | 200.0 | 202.0 | 202.0 | 200.0 | 198.0 |
| $ST_{Act}$ (sec) | 480.0 | 600.0 | 720.0 | 840.0 | 960.0 |
| $ST_{Inf}$ (sec) | 553.4 | 713.5 | 840.7 | 974.7 | 1215.7 |
| $MT_{Act}$ (°F.) | 800.3 | 746.2 | 696.9 | 653.6 | 612.3 |
| $MT_{Inf}$ (°F.) | 787.1 | 711.8 | 657.1 | 603.9 | 518.9 |
| AT (°F.) | 68.0 | 74.0 | 80.0 | 84.0 | 90.0 |
| ET (°F.) | 196.0 | 194.0 | 194.0 | 192.0 | 188.0 |
| $ST_{Act}$ (sec) | 1080.0 | 1200.0 | 1320.0 | 1440.0 | 1560.0 |
| $ST_{Inf}$ (sec) | 1319.1 | 1426.9 | 1539.6 | 1719.0 | 1846.2 |

TABLE II-continued

| | | | | | |
|---|---|---|---|---|---|
| $MT_{Act}$ (°F.) | 575.9 | 541.6 | 510.2 | 480.9 | 454.6 |
| $MT_{Inf}$ (°F.) | 486.2 | 454.3 | 423.1 | 377.8 | 348.6 |
| AT (°F.) | 94.0 | 96.0 | 98.0 | 102.0 | 104.0 |
| ET (°F.) | 188.0 | 186.0 | 184.0 | 182.0 | 180.0 |
| $ST_{Act}$ (sec) | 1680.0 | 1800.0 | 1920.0 | 2040.0 | 2160.0 |
| $ST_{Inf}$ (sec) | 1912.3 | 1980.9 | 2122.1 | 2196.1 | 2351.1 |
| $MT_{Act}$ (°F.) | 429.3 | 407.2 | 385.0 | 365.9 | 345.8 |
| $MT_{Inf}$ (°F.) | 334.3 | 320.3 | 292.8 | 279.4 | 253.2 |
| AT (°F.) | 106.0 | 106.0 | 108.0 | 108.0 | 110.0 |
| ET (°F.) | 180.0 | 178.0 | 176.0 | 174.0 | 172.0 |

TABLE III

| | | | | | |
|---|---|---|---|---|---|
| $ST_{Act}$ (sec) | 0.0 | 90.0 | 180.0 | 300.0 | 360.0 |
| $ST_{Inf}$ (sec) | 0.0 | 198.5 | 268.4 | 340.3 | 414.3 |
| $MT_{Act}$ (°F.) | 993.0 | 922.2 | 849.2 | 758.4 | 719.5 |
| $MT_{Inf}$ (°F.) | 993.0 | 876.7 | 839.0 | 802.0 | 765.6 |
| AT (°F.) | 80.0 | 88.0 | 88.0 | 88.0 | 88.0 |
| ET (°F.) | 158.0 | 160.0 | 158.0 | 156.0 | 154.0 |
| $ST_{Act}$ (sec) | 480.0 | 600.0 | 720.0 | 840.0 | 960.0 |
| $ST_{Inf}$ (sec) | 490.6 | 650.7 | 734.7 | 821.8 | 912.0 |
| $MT_{Act}$ (°F.) | 650.5 | 594.6 | 547.8 | 508.1 | 474.6 |
| $MT_{Inf}$ (°F.) | 729.7 | 659.9 | 625.9 | 592.5 | 559.8 |
| AT (°F.) | 88.0 | 90.0 | 90.0 | 90.0 | 90.0 |
| ET (°F.) | 152.0 | 150.0 | 148.0 | 146.0 | 144.0 |
| $ST_{Act}$ (sec) | 1080.0 | 1200.0 | 1320.0 | 1440.0 | 1560.0 |
| $ST_{Inf}$ (sec) | 1102.8 | 1102.8 | 1204.1 | 1309.6 | 1535.2 |
| $MT_{Act}$ (°F.) | 443.0 | 415.6 | 391.3 | 369.1 | 347.9 |
| $MT_{Inf}$ (°F.) | 496.4 | 496.4 | 465.8 | 435.8 | 377.9 |
| AT (°F.) | 92.0 | 92.0 | 92.0 | 92.0 | 94.0 |
| ET (°F.) | 142.0 | 142.0 | 140.0 | 138.0 | 136.0 |
| $ST_{Act}$ (sec) | 1680.0 | 1800.0 | 1920.0 | 2040.0 | 2160.0 |
| $ST_{Inf}$ (sec) | 1535.2 | 1656.2 | 1783.4 | 1783.4 | 1917.5 |
| $MT_{Act}$ (°F.) | 328.8 | 311.8 | 294.8 | 279.9 | 266.0 |
| $MT_{Inf}$ (°F.) | 377.9 | 350.1 | 323.0 | 323.0 | 296.8 |
| AT (°F.) | 94.0 | 94.0 | 94.0 | 94.0 | 94.0 |
| ET (°F.) | 136.0 | 134.0 | 132.0 | 132.0 | 130.0 |

As can be readily seen from the data in Tables I–III, the inferred soak times $ST_{inf}$ match the corresponding actual soak times $ST_{Act}$ with sufficient accuracy for engine control purposes. As the soak time gets longer and longer, the difference between the engine temperature ET and charging air temperature AT decreases until they both equal the ambient air temperature and their difference is thus equal to zero. The data in Tables I–III also show that the inferred catalyst midbed temperatures $MT_{inf}$ match the corresponding actual midbed temperatures $MT_{Act}$ with sufficient accuracy for engine control purposes.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. An electronic engine control system for controlling at least one feature of an internal combustion engine supplied with an engine coolant and a mixture of charging air and fuel, said control system comprising:

an engine sensor for measuring the temperature of the engine;

an air sensor for measuring the temperature of the charging air supplied to the engine; and at least one computer with software for storing the temperature measured by said engine sensor and air sensor at the time the engine is turned off, software for providing an inferred soak time based on the temperature of the engine and the charging air stored at the time the engine is turned off and respectively measured by said engine sensor and air sensor at the time the engine is restarted, and a software control strategy for controlling at least one feature of the engine based on said inferred soak time.

2. The control system of claim 1, wherein said at least one feature being controlled is a temperature in an exhaust system of the internal combustion engine, said at least one computer having a software control strategy based on an engine exhaust temperature inferred from said inferred soak time.

3. The control system of claim 2, wherein said at least one computer has a software control strategy based on at least one temperature from a group of temperatures consisting of a catalyst midbed temperature, an exhaust gas oxygen sensor temperature, and an exhaust manifold gas temperature, wherein said at least one temperature is inferred from said inferred soak time.

4. The control system of claim 1, wherein said at least one feature being controlled is an air/fuel ratio used in the internal combustion engine, said control system further comprising:

at least one mechanism capable of being actuated for regulating the air/fuel ratio used in the engine; and said at least one computer having software for controlling the actuation of said at least one mechanism and thereby control the air/fuel ratio used in the engine based on said inferred soak time.

5. The control system of claim 4, wherein said at least one computer has software for controlling the actuation of said at least one mechanism and thereby control the air/fuel ratio used in the engine and wherein that control is based on a fuel injector temperature which is inferred from said inferred soak time.

6. The control system of claim 1, wherein the Software of said at least one computer calculates the soak time between when the engine is turned off and then restarted based on the equation:

$$\text{soak-time} = \left[ -\ln\left( \frac{(ET - AT)}{(ET_s - AT_s)} \right) \right] * TC$$

where $ET_s$ is the temperature of the engine at the time the engine is turned off, $AT_s$ is the temperature of the charging air supplied to the engine at the time the engine is turned off, $ET$ is the temperature of the engine at the time the engine is restarted, $AT$ is the temperature of the charging air at the time the engine is restarted, and $TC$ is a first order time constant calibrated for the engine using actual soak times measured for a plurality of engine and charging air temperatures.

7. The control system of claim 1, wherein the software of said at least one computer provides the soak time between when the engine is turned off and then restarted based on a look-up table indexed with an input equalling:

$$\frac{(ET - AT)}{(ET_s - AT_s)}$$

and an output equalling said inferred soak time, where $ET_s$ is the temperature of the engine at the time the engine is turned off, $AT_s$ is the temperature of the charging air supplied to the engine at the time the engine is turned off, $ET$ is the temperature of the engine at the time the engine is restarted, and $AT$ is the temperature of the charging air at the time the engine is restarted.

8. The control system of claim 1, wherein said engine sensor measures the temperature of the engine coolant, which temperature is used by the software of said at least one computer to provide said inferred soak time.

9. The control system of claim 1, wherein said engine includes a combustion chamber wall and said engine sensor measures the temperature of the combustion chamber wall, which temperature is used by the software of said at least one computer to provide said inferred soak time.

10. A method of controlling at least one feature of an internal combustion engine supplied with an engine coolant and a mixture of charging air and fuel, said method comprising the steps of:

measuring the temperature of the engine at the time the engine is turned off and measuring the temperature of the engine when the engine is restarted;

measuring the temperature of the charging air at the time the engine is turned-off and measuring the temperature of the charging air when the engine is restarted;

storing the measured temperature of the engine and of the charging air at the time the engine is turned off in a computer memory;

providing an inferred soak time using a computer program based on the temperature of the engine and of the charging air stored at the time the engine is turned off and the temperature of the engine and of the charging air measured at the time the engine is restarted; and controlling at least one feature of the engine using a software strategy based on the inferred soak time.

11. The method of claim 10, further including the step of:

controlling at least one temperature in an exhaust system of the engine using a software strategy based on the inferred soak time.

12. The method of claim 10, wherein said at least one feature being controlled is the air/fuel ratio used in the internal combustion engine, said method including the steps of:

actuating at least one mechanism for regulating the air/fuel ratio used in the engine; and controlling the air/fuel ratio used in the engine by controlling the actuation of the at least one mechanism using a computer program based on the inferred soak time.

13. The method of claim 12, further including the step of:

controlling the air/fuel ratio used in the engine by controlling the actuation of the at least one mechanism with a computer program using the temperature of fuel injectors which is inferred from the calculated inferred soak time.

14. The method of claim 10, further including the step of:

calculating the inferred soak time using a computer program based on the equation:

$$\text{soak-time} = \left[ -\ln\left( \frac{(ET - AT)}{(ET_s - AT_s)} \right) \right] * TC$$

where $ET_s$ is the temperature of the engine stored at the time the engine is turned off, $AT_s$ is the temperature of the charging air stored at the time the engine is turned off, $ET$ is the temperature of the engine at the time the engine is restarted, $AT$ is the temperature of the charging air at the time the engine is restarted, and $TC$ is a first order time constant calibrated for the engine using actual soak times measured for a plurality of engine and charging air temperatures.

15. The method of claim 10, further including the step of:

providing the soak time using a computer program based on a look-up table indexed with an input equalling:

$$\frac{(ET - AT)}{(ET_s - AT_s)}$$

and an output equalling said inferred soak time, where $ET_s$ is the temperature of the engine at the time the engine is turned off, $AT_s$ is the temperature of the charging air supplied to the engine at the time the engine is turned off, ET is the temperature of the engine at the time the engine is restarted, and AT is the temperature of the charging air at the time the engine is restarted.

16. The method of claim 10, further including the step of:

controlling temperatures in an exhaust system of the internal combustion engine using a software control strategy based on engine exhaust temperatures inferred from the inferred soak time.

17. The method of claim 16, further including the step of:

controlling temperatures in an exhaust system of the internal combustion engine using a software control strategy based on at least one temperature from a group of temperatures consisting of a catalyst midbed temperature, an exhaust gas oxygen sensor temperature, and an exhaust manifold gas temperature, wherein said at least one temperature is inferred from said inferred soak time.

18. A method of calculating an inferred soak time used in controlling at least one feature of an internal combustion engine supplied with an engine coolant and a mixture of charging air and fuel and having an exhaust system, said method of calculating comprising the steps-of:

measuring the temperature of the engine at the time the engine is turned off and measuring the temperature of the engine when the engine is restarted;

measuring the temperature of the charging air at the time the engine is turned off and measuring the temperature of the charging air when the engine is restarted;

storing the measured temperature of the engine and of the charging air at the time the engine is turned off in a computer memory; and calculating the inferred soak time between when the engine is turned off and then restarted using a computer program based on the measured temperature of the engine and of the charging air stored at the time the engine is turned off and the temperature of the engine and of the charging air measured at the time the engine is restarted.

19. The method of claim 18, further including the step of:

calculating the inferred soak time using a computer program based on the equation:

$$\text{soak-time} = \left[ -\ln\left( \frac{(ET - AT)}{(ET_s - AT_s)} \right) \right] * TC$$

where $ET_s$ is the temperature of the engine stored at the time the engine is turned off, $AT_s$ is the temperature of the charging air stored at the time the engine is turned off, ET is the temperature of the engine at the time the engine is restarted, AT is the temperature of the charging air at the time the engine is restarted, and TC is a first order time constant calibrated for the engine using actual soak times measured for a plurality of engine and charging air temperatures.

20. The method of claim 18, further including the steps of:

measuring the temperature of the engine coolant at the time the engine is turned off and measuring the temperature of the engine coolant when the engine is restarted;

storing the measured temperature of the engine coolant at the time the engine is turned off in a computer memory; and calculating the inferred soak time between when the engine is turned off and then restarted using a computer program based on the measured temperature of the engine coolant and of the charging air stored at the time the engine is turned off and the temperature of the engine coolant and of the charging air measured at the time the engine is restarted.

* * * * *